(12) United States Patent
Kishbaugh et al.

(10) Patent No.: US 7,364,788 B2
(45) Date of Patent: Apr. 29, 2008

(54) FIBER-FILLED MOLDED ARTICLES

(75) Inventors: Levi A. Kishbaugh, Groveland, MA (US); Kevin J. Levesque, Andover, MA (US); Albert H. Guillemette, Dracut, MA (US); Liqin Chen, West Roxbury, MA (US); Jingyi Xu, York, PA (US); Kelvin T. Okamoto, Carlsbad, CA (US)

(73) Assignee: Trexel, Inc., Woburn, MA (US)

( * ) Notice: Subject to any disclaimer, the term of this patent is extended or adjusted under 35 U.S.C. 154(b) by 171 days.

(21) Appl. No.: 10/744,757

(22) Filed: Dec. 23, 2003

(65) Prior Publication Data
US 2005/0042434 A1 Feb. 24, 2005

Related U.S. Application Data

(63) Continuation of application No. 10/381,652, filed as application No. PCT/US01/30649 on Oct. 1, 2001, now abandoned, which is a continuation-in-part of application No. 09/733,760, filed on Dec. 8, 2000.

(60) Provisional application No. 60/236,977, filed on Sep. 29, 2000.

(51) Int. Cl.
*B32B 3/26* (2006.01)
*B29D 7/00* (2006.01)
*C08F 20/00* (2006.01)
*C08J 9/00* (2006.01)

(52) U.S. Cl. ............... 428/304.4; 264/45.9; 264/257; 525/445; 521/97; 521/160

(58) Field of Classification Search ............ 428/219, 428/303, 317, 297, 538, 304.4; 264/258, 264/137, 257, 324, 45.9; 525/445; 521/160, 521/97
See application file for complete search history.

(56) References Cited

U.S. PATENT DOCUMENTS

| | | | |
|---|---|---|---|
| 3,436,446 A | | 4/1969 | Angell |
| 3,944,698 A | * | 3/1976 | Dierks et al. ............ 428/219 |
| 4,113,908 A | | 9/1978 | Shinomura |
| 4,241,199 A | * | 12/1980 | Dunleavy .............. 525/445 |
| 4,272,618 A | * | 6/1981 | Dominguez et al. ........ 521/160 |
| 4,340,562 A | | 7/1982 | Gross et al. |
| 4,444,832 A | | 4/1984 | Mazzola et al. |
| 4,473,665 A | | 9/1984 | Martini-Vvedensky et al. |

(Continued)

FOREIGN PATENT DOCUMENTS

EP 0683037 A1 11/1995

(Continued)

OTHER PUBLICATIONS

Matuana-Malanda, L. et al., "Production of Microcellular Foamed PVC/Wood-Fibre Composites: Processing and Cell Morphology Relationship," ANTEC '96, pp. 1900-1907.
International Search Report PCT/US01/30649, mailed Dec. 13, 2001.
International Preliminary Examination Report PCT/US01/30649, mailed Dec. 5, 2002.
Translation of Office Action from Japanese Patent Apl. No. 2002-530294, mailed Apr. 11, 2007.

*Primary Examiner*—N. Edwards
(74) *Attorney, Agent, or Firm*—Wolf, Greenfield & Sacks, P.C.

(57) ABSTRACT

Polymer molding processes, such as injection-molding processes, include use of a viscosity-reducing supercritical fluid additive resulting in less breakage of reinforcing fibers upon introduction into the mold.

24 Claims, 12 Drawing Sheets

100 μm

U.S. PATENT DOCUMENTS

| | | |
|---|---|---|
| 4,643,940 A | 2/1987 | Shaw et al. |
| 4,649,080 A * | 3/1987 | Fischer et al. ............... 428/419 |
| 4,692,291 A | 9/1987 | Angell |
| 5,156,907 A | 10/1992 | Layden |
| 5,158,986 A | 10/1992 | Cha et al. |
| 5,160,674 A | 11/1992 | Colton et al. |
| 5,294,461 A | 3/1994 | Ishida |
| 5,334,356 A | 8/1994 | Baldwin et al. |
| 5,419,957 A | 5/1995 | Martin et al. |
| 5,866,053 A | 2/1999 | Park et al. |
| 5,948,706 A * | 9/1999 | Riedel et al. ................. 442/59 |
| 6,005,013 A | 12/1999 | Suh et al. |
| 6,010,656 A | 1/2000 | Nomura et al. |
| 6,051,174 A | 4/2000 | Park et al. |
| 6,159,589 A * | 12/2000 | Isenberg et al. ............. 428/220 |
| 6,169,122 B1 | 1/2001 | Blizard et al. |
| 6,231,942 B1 | 5/2001 | Blizard et al. |
| 6,232,354 B1 | 5/2001 | Tan |
| 6,235,380 B1 | 5/2001 | Tupil et al. |
| 6,251,319 B1 * | 6/2001 | Tusim et al. ............... 264/45.9 |
| 6,261,679 B1 * | 7/2001 | Chen et al. ............... 428/317.9 |
| 6,284,810 B1 | 9/2001 | Burnham et al. |
| 6,294,115 B1 | 9/2001 | Blizard et al. |
| 6,322,347 B1 | 11/2001 | Xu |
| 6,339,031 B1 | 1/2002 | Tan |
| 6,376,059 B1 | 4/2002 | Anderson et al. |
| RE37,932 E | 12/2002 | Baldwin et al. |
| 6,521,693 B2 | 2/2003 | Saito et al. |
| 6,579,910 B2 | 6/2003 | Xu |
| 6,593,384 B2 * | 7/2003 | Anderson et al. ............. 521/97 |
| 6,602,063 B1 | 8/2003 | Cardona |
| 6,602,064 B1 | 8/2003 | Chen et al. |
| 6,613,811 B1 | 9/2003 | Pallaver et al. |
| 6,616,434 B1 | 9/2003 | Burnham et al. |
| 6,630,231 B2 * | 10/2003 | Perez et al. ............... 428/297.4 |
| 6,646,019 B2 * | 11/2003 | Perez et al. ................. 521/142 |
| 6,706,223 B1 | 3/2004 | Anderson et al. |

FOREIGN PATENT DOCUMENTS

| | | |
|---|---|---|
| JP | 49-089736 | 8/1974 |
| JP | 61-501398 | 7/1986 |
| JP | 62-156142 | 7/1987 |
| JP | 06-506724 A1 | 7/1994 |
| JP | 09-296053 | 11/1997 |
| JP | 11-035751 | 2/1999 |
| JP | 2000-084968 | 3/2000 |
| JP | 2000-257442 | 9/2000 |
| JP | 2001-010542 | 1/2001 |
| JP | 2001-179738 | 7/2001 |
| JP | 2001-284959 | 10/2001 |
| JP | 2001-316534 | 11/2001 |
| WO | 86/01152 | 2/1986 |
| WO | 92-17533 | 10/1992 |
| WO | WO9808667 | 3/1998 |
| WO | WO9831521 | 7/1998 |
| WO | 00/026005 A1 | 5/2000 |
| WO | WO 00/43193 | 7/2000 |

\* cited by examiner

100μm

FIBER-FILLED MOLDED ARTICLES

RELATED APPLICATIONS

This application is a continuation of U.S. patent application Ser. No. 10/381,652, entitled "FIBER-FILLED MOLDED ARTICLES," having a filing date of Oct. 1, 2001, which is a U.S. National of International Application Number PCT/US01/30649, filed on Oct. 1, 2001, which is a continuation-in-part of U.S. patent application Ser. No. 09/733,760,entitled "FIBER-FILLED MOLDED ARTICLES," having a filing date of Dec. 8, 2000, which claims priority of U.S. Provisional Patent Application Ser. No. 60/236,977, filed on Sep. 29, 2000. The disclosures of U.S. patent application Ser. No. 10/381,652, International Application Number PCT/US01/30649 and U.S. Provisional Patent Application Ser. No. 60/236,977 are incorporated herein by reference.

FIELD OF THE INVENTION

The present invention relates generally to injection molding of polymeric articles, and more particularly to the injection molding of microcellular articles containing reinforcing fibers.

BACKGROUND OF THE INVENTION

Polymeric molding is a well-developed field. One broad area of polymeric molding involves introducing a fluid polymeric material into a mold, allowing the polymeric material to assume the interior shape of the mold and to harden therein, and then removing a resultant polymeric article from the mold. Such techniques are commonly known as injection molding, intrusion molding, and others. Solid polymeric articles and polymeric foams can be made using these techniques.

Polymeric foam articles can be produced by injecting a physical blowing agent into a molten polymeric stream, dispersing the blowing agent in the polymer to form a mixture of blowing agent and polymer, injecting the mixture into a mold having a desired shape, and allowing the mixture to solidify in the mold. A pressure drop in the mixture can cause the cells in the polymer to grow. Under some conditions cells can be made to remain isolated in such materials, and a closed-cell foamed material results. Under other, typically more violent foaming conditions, the cells rupture or become interconnected and an open-cell material results. As an alternative to a physical blowing agent, a chemical blowing agent can be used which undergoes a chemical reaction in the polymer material causing formation of a gas. Chemical blowing agents generally are low molecular weight organic compounds that decompose at a critical temperature and release a gas such as nitrogen, carbon dioxide, or carbon monoxide.

Polymeric foam molding is well known. Among the many examples of polymeric foam molding art, U.S. Pat. No. 3,436,446 (Angell) describes a method and apparatus for molding foamed plastic articles with a solid skin by controlling the pressure and temperature of the mold.

Microcellular material typically is defined by polymeric foam of very small cell size. Various microcellular material is described in U.S. Pat. Nos. 5,158,986 and 4,473,665. These patents describe subjecting a single-phase solution of polymeric material and physical blowing agent to thermodynamic instability required to create sites of nucleation of very high density, followed by controlled cell growth to produce microcellular material.

Microcellular molding techniques are described in the patent literature. U.S. Pat. Nos. 4,473,665 (Martini-Vvedensky) and 5,158,986 (Cha et al.) and International Patent Application No. PCT/US99/26192 of Pierick, et al. filed Nov. 4, 1999 and entitled "Molded Polymeric Material Including Microcellular, Injection-Molded, and Low-Density Polymeric Material", and International Patent Application No. PCT/US98/00773 of Pierick, et al., filed Jan. 16, 1998, published Jul. 23, 1998 (WO 98/31521) and entitled "Injection Molding of Microcellular Material" describe a variety of polymeric molding techniques, systems and molded articles, including microcellular articles.

It is known to introduce reinforcing fibers into polymeric articles, including molded polymeric articles, to improve strength. For example, U.S. Pat. No.5,156,907 (Layden) describes a technique for injection molding fiber-reinforced articles. Injection conditions are controlled to produce a fiber plane orientation within the article which reportedly reinforces the article.

U.S. Pat. No. 6,010,656 (Nomura) describes injection molding of light-weight fiber-reinforced resin products. Fiber-containing pellets are melted and injected into a cavity, then the cavity is opened until its volume is equal to that of the final molded product. A high-strength product reportedly results.

Other examples of patents that describe fiber-containing polymeric articles include U.S. Pat. Nos. 4,692,291 (Angell), 5,294,461 (Ishida) and 4,340,562 (Gross). This list is intended to be exemplary, not exclusive.

Although introduction of reinforcing fibers into molded polymeric articles is known, one problem that can be encountered in the injection molding of polymeric articles including reinforcing fibers is that the fibers can break during introduction into the mold, which can compromise properties of the resultant articles. Accordingly, it would be advantageous to produce injection-molded fiber-reinforced polymeric articles (or mold such polymeric articles using similar techniques) while maximizing properties of the final product.

SUMMARY OF THE INVENTION

The present invention provides polymer molding processes that reduce fiber breakage upon introduction of fiber-laden polymeric material into a mold. In one aspect a series of methods are provided, and in another aspect a series of fiber-containing molded polymeric articles are provided.

In one aspect, the invention involves the discovery that physical degradation of fibers in polymeric material injected into a mold can be reduced by incorporating a viscosity-reducing additive into the polymeric material. Reduction in viscosity of material injected into the mold results in less stress applied to fibers during the injection process, especially during high-shear steps such as passage through the mold gate, reducing fiber breakage.

In another aspect, the invention involves the discovery that fiber orientation in an article formed from polymeric material injected into a mold can be reduced by incorporating a viscosity-reducing additive into the polymeric material. It is believed that the fibers more easily become disoriented as a result of the lower viscosity. The reduction of fiber orientation can provide the article with more isotropic (i.e., balanced along different axes) properties.

Various methods of the invention involve molding polymeric articles that include at least a certain percentage of fibers that have a length greater than a certain minimum length. Other methods involve injecting polymeric material into a mold while maintaining the average length of fibers within the polymeric material at least a certain percentage of the average length of the fibers in the precursor material prior to injection into the mold. All of the methods can involve maintaining average length, or median length of fibers at minimum values.

Articles of the invention include molded polymeric articles that contain a plurality of fibers, wherein at least a minimum percentage of the total number of fibers have a length greater than a certain minimum length. Other articles of the invention are foam injection molded polymeric articles including at least a certain number of fibers that have a certain minimum length, where solid polymeric articles molded under identical conditions with the exception of conditions necessary to form the solid article, do not meet the minimum fiber length standards of the foam article. Other articles of the invention include molded polymeric articles that have a plurality of fibers dispersed therein, wherein the ratio of the article's flex modulus measured in a first direction (e.g., in which polymeric material fills the mold while forming the article) over the flex modulus measured in a second direction (e.g., perpendicular to the first direction) is less than a critical value. Other articles of the invention include molded polymeric materials that have a plurality of fibers dispersed therein, wherein less than a critical fraction of the total number of fibers are aligned in a direction within a critical number of degrees from the direction in which polymeric material fills the mold while forming the article.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION OF THE INVENTION

Figure 1:
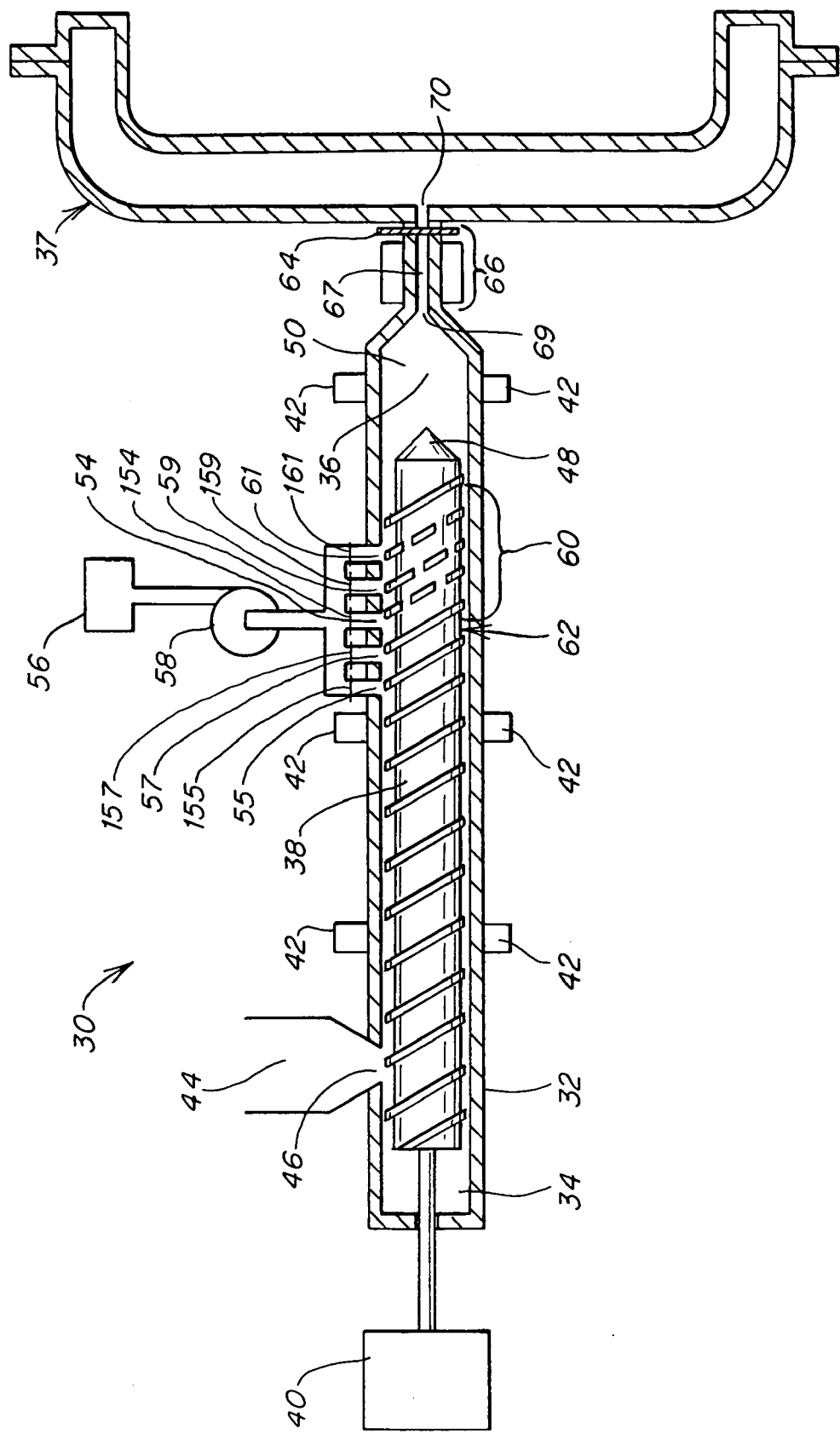
FIG. 1 is a schematic illustration of injection molding apparatus useful for the invention.

Commonly-owned, co-pending international patent publication nos. WO 98/08667, published Mar. 5, 1998, WO 98/31521, published Jul. 23, 1998, and WO 00/26005, published May 11, 2000 are incorporated herein by reference.

The present invention provides systems, methods, and articles in connection with intrusion and injection molding of polymeric material, and other techniques. For example, although injection and intrusion molding are primarily described, the invention can be modified readily by those of ordinary skill in the art for use in other molding methods such as, without limitation, low-pressure molding, co-injection molding, laminar molding, injection compression, and the like.

The various embodiments and aspects of the invention will be better understood from the following definitions. As used herein, "nucleation" defines a process by which a homogeneous, single-phase solution of polymeric material, in which is dissolved molecules of a species that is a gas under ambient conditions, undergoes formations of clusters of molecules of the species that define "nucleation sites", from which cells will grow. That is, "nucleation" means a change from a homogeneous, single-phase solution to a mixture in which sites of aggregation of at least several molecules of blowing agent are formed. Nucleation defines that transitory state when gas, in solution in a polymer melt, comes out of solution to form a suspension of bubbles within the polymer melt. Generally this transition state is forced to occur by changing the solubility of the polymer melt from a state of sufficient solubility to contain a certain quantity of gas in solution to a state of insufficient solubility to contain that same quantity of gas in solution. Nucleation can be effected by subjecting the homogeneous, single-phase solution to rapid thermodynamic instability, such as rapid temperature change, rapid pressure drop, or both. Rapid pressure drop can be created using a nucleating pathway, defined below. Rapid temperature change can be created using temperature control (heated or cooled extruder portion, mold, etc), a hot glycerin bath, or the like. "Microcellular nucleation", as used herein, means nucleation at a cell density high enough to create microcellular material upon controlled expansion.

A "nucleating agent" is a dispersed agent, such as talc or other filler particles (but not including reinforcing fibers, added to a polymer and able to promote formation of nucleation sites from a single-phase, homogeneous solution. Thus "nucleation sites" do not define locations, within a polymer, at which nucleating agent particles reside. "Nucleated" refers to a state of a fluid polymeric material that had contained a single-phase, homogeneous solution including a dissolved species that is a gas under ambient conditions, following an event (typically thermodynamic instability) leading to the formation of nucleation sites.

"Non-nucleated" refers to a state defined by a homogeneous, single-phase solution of polymeric material and dissolved species that is a gas under ambient conditions, absent nucleation sites. A "non-nucleated" material can include nucleating agent such as talc. A "polymeric material/blowing agent mixture" can be a single-phase, non-nucleated solution of at least the two, a nucleated solution of at least the two, or a mixture in which blowing agent cells have grown. "Nucleating pathway" is meant to define a pathway that forms part of microcellular polymeric foam extrusion apparatus and in which, under conditions in which the apparatus is designed to operate (typically at pressures of from about 1500 to about 30,000 psi upstream of the nucleator and at flow rates of greater than about 1 pound polymeric material per hour), the pressure of a single-phase solution of polymeric material admixed with blowing agent in the system drops below the saturation pressure for the particular blowing agent concentration at a rate or rates facilitating rapid nucleation. A nucleating pathway defines, optionally with other nucleating pathways, a nucleation or nucleating region of a device.

For purposes of the present invention, microcellular material is defined as foamed material having an average cell size of less than about 100 microns in diameter, or material of cell density of generally greater than at least about $10^6$ cells per cubic centimeter, or preferably both. "Cell density" is defined as the number of cells per cubic centimeter of original, unexpanded polymeric material. Non-microcellular foams have cell sizes and cell densities outside of these ranges. The void fraction of microcellular material generally varies from 5% to 98%.

In some embodiments, microcellular material of the invention is produced having average cell size of less than about 100 microns. In other embodiments, microcellular material of the invention is produced having average cell size of less than about 50 microns. In some embodiments particularly small cell size is desired, and in these embodiments material of the invention has average cell size of less than about 20 microns, more preferably less than about 10 microns, and more preferably still less than about 5 microns. The microcellular material preferably has a maximum cell size of about 100 microns. In embodiments where particularly small cell size is desired, the material can have maximum cell size of about 50 microns, more preferably about 25 microns, more preferably about 15 microns, more preferably about 8 microns, and more preferably still about 5 microns. A set of embodiments includes all combinations of these noted average cell sizes and maximum cell sizes. For example, one embodiment in this set of embodiments includes microcellular material having an average cell size of less than about 30 microns with a maximum cell size of about 50 microns, and as another example an average cell size of less than about 30 microns with a maximum cell size of about 35 microns, etc. That is, microcellular material designed for a variety of purposes can be produced having a particular combination of average cell size and a maximum cell size preferable for that purpose. Control of cell size is described in greater detail below.

Techniques described herein can be adjusted by those of ordinary skill in the art to produce a variety of molded polymeric material, including microcellular polymeric material in one set of embodiments. In another set of embodiments, molded foam articles are produced in which at least 70% of the total number of cells in the polymeric portion have a cell size of less than 150 microns. In some embodiments at least 80%, in other cases at least 90%, in other cases at least 95%, and in other cases at least 99% of the total number of cells have a cell size of less than 150 microns. In other embodiments, a molded foam article can be provided in which at least 30% of the total number of cells have a cell size of less than 800 microns, more preferably less than 500 microns, and more preferably less than 200 microns.

In one embodiment, essentially closed-cell microcellular material is produced in accordance with the techniques of the present invention. As used herein, "essentially closed-cell" is meant to define material that, at a thickness of about 100 microns, contains no connected cell pathway through the material.

Referring now to FIG. 1, a molding system 30 is illustrated schematically that can be used to carry out molding according to a variety of embodiments of the invention. Although FIG. 1 (as well as FIG. 2) is similar to figures shown in prior, commonly-owned, published patent applications, differences between this and prior applications will become apparent from the description herein. International Patent Publication WO 98/08667, referenced above, can be consulted for a detailed description of FIGS. 1 and 2. System 30 of FIG. 1 includes a barrel 32 having a first, upstream end 34, and a second, downstream end 36 connected to a molding chamber 37. Mounted for rotation within barrel 32 is a screw 38 operably connected, at its upstream end, to a drive motor 40. Although not shown in detail, screw 38 includes feed, transition, gas injection, mixing, and metering sections.

Positioned along barrel 32, optionally, are temperature control units 42. Barrel 32 is constructed and arranged to receive a precursor of molded polymeric material, specifically, a precursor of molded polymeric microcellular material. As used herein, "precursor of molded polymeric material" is meant to include all materials that are fluid, or can form a fluid and that subsequently can harden to form a molded polymeric article. Typically, the precursor is defined by thermoplastic polymer pellets, but can include other species. Preferably, a thermoplastic polymer or combination of thermoplastic polymers is used in the invention and is selected from among amorphous, semicrystalline, and crystalline material including polyolefins such as polyethylene and polypropylene, fluoropolymers, cross-linkable polyolefins, polyamides, polyimides, polyesters, polyvinyl chloride, polyaromatics such as styrenic polymers (e.g., polystyrene, ABS), and the like. Thermoplastic elastomers can be used as well, especially metallocene-catalyzed polyethylene. Included as polymers that can be molded in accordance with the invention are those having a melt flow rate of less than about 40, or having a melt flow rate of less than about 10. In one embodiment the precursor can be defined by species that will react to form microcellular-polymeric material as described, under a variety of conditions, e.g. thermosetting polymers.

Typically, introduction of the precursor of polymeric material utilizes a standard hopper 44 for containing pelletized polymeric material to be fed into the extruder barrel through orifice 46, although a precursor can be a fluid prepolymeric material injected through an orifice and polymerized within the barrel via, for example, auxiliary polymerization agents. In connection with the present invention, it is important only that a fluid stream of polymeric material be established in the system. The pellets of polymeric material can contain reinforcing fibers.

Immediately downstream of downstream end 48 of screw 38 in FIG. 1 is a region 50 which can be a temperature adjustment and control region, auxiliary mixing region, auxiliary pumping region, or the like. In one embodiment, region 50 can be replaced by a second screw in tandem which can include a cooling region. In an embodiment in which screw 38 is a reciprocating screw in an injection molding system, region 50 can define an accumulation region in which a single-phase, non-nucleated solution of polymeric material and a blowing agent is accumulated prior to injection into mold 37.

In preferred embodiments a supercritical fluid additive is used in injection molding techniques, and is mixed with polymeric material in polymer processing apparatus such as that described with reference to FIG. 1 prior to injection of the resulting mixture into a mold. The supercritical fluid additive preferably serves also as a blowing agent for forming a molded polymeric foam article, preferably a molded microcellular polymeric article. Thus "supercritical fluid additive" and "blowing agents" are used interchangeably herein, although it is to be understood that in some embodiments of the invention this additive is used in molding processes but solid (non-foam) parts or parts with very low levels of void volume result. Advantages associated with use of a supercritical fluid additive are described more fully below.

Techniques of the invention preferably use a physical supercritical fluid additive (blowing agent), that is, an agent that is a gas under ambient conditions (described more fully below). However, chemical blowing agents can be used and can be formulated with polymeric pellets introduced into hopper 44. Suitable chemical blowing agents include those typically relatively low molecular weight organic compounds that decompose at a critical temperature or another condition achievable in extrusion and release a gas or gases such as nitrogen, carbon dioxide, or carbon monoxide. Examples include azo compounds such as azo dicarbonamide.

As mentioned, in preferred embodiments a physical blowing agent is used. One advantage of embodiments in which a physical blowing agent, rather than a chemical blowing agent, is used is that recyclability of product is maximized. Thus, material of the present invention in this set of embodiments includes residual chemical blowing agent, or reaction by-product of chemical blowing agent, in an amount less than that inherently found in articles blown with 0.1% by weight chemical blowing agent or more, preferably in an amount less than that inherently found in articles blown with 0.05% by weight chemical blowing agent or more. In particularly preferred embodiments, the material is characterized by being essentially free of residual chemical blowing agent or free of reaction by-products of chemical blowing agent. That is, they include less residual-chemical blowing agent or by-product that is inherently found in articles blown with any chemical blowing agent. In this embodiment, along barrel 32 of system 30 is at least one port 54 in fluid communication with a source 56 of a physical blowing agent. Any of a wide variety of physical blowing agents known to those of ordinary skill in the art such as hydrocarbons, chlorofluorocarbons, nitrogen, carbon dioxide, helium, and the like can be used in connection with the invention, or mixtures thereof, and, according to a preferred embodiment, source 56 provides an atmospheric gas, preferably nitrogen or carbon dioxide as a blowing agent. Any of these can be used alone or in combination.

As supercritical fluid additive, in one embodiment solely supercritical carbon dioxide, nitrogen, or a combination is used. Supercritical carbon dioxide or nitrogen additive can be introduced into the extruder and made to rapidly form a single-phase solution with the polymeric material either by injecting the additive as a supercritical fluid, or injecting it as a gas or liquid and allowing conditions within the extruder to render it supercritical, in many cases within seconds. Injection of the additive into the extruder in a supercritical state is preferred.

The mixture (preferably a single-phase solution) of supercritical additive and polymeric material formed in this manner has a very low viscosity which advantageously allows lower temperature molding, as well as rapid filling of molds having close tolerances to form very thin molded parts, parts with very high length-to-thickness thickness ratios, parts including thicker distal regions, molding carried out at low clamp force, etc.

A pressure and metering device 58 typically is provided between blowing agent (or additive) source 56 and has at least one port 54. Device 58 can be used to meter the mass of the blowing agent between 0.01 lbs/hour and 70 lbs/hour, or between 0.04 lbs/hour and 35 lbs/hour, and more preferably between 0.2 lbs/hour and 12 lbs/hour so as to control the amount of the blowing agent in the polymeric stream within the extruder to maintain the blowing agent at a desired level. The amount of supercritical fluid or additive in the polymeric stream can be controlled to be at a variety of levels, including between about 0.05% and 10% by weight of the mixture, or between about 0.1% and 5% by weight. The particular blowing agent used (carbon dioxide, nitrogen, etc.) and the amount of blowing agent used can be selected by those of ordinary skill in the art with benefit of the present disclosure, based upon the polymer, desired viscosity reduction, the density reduction, cell size and physical properties desired. In embodiments where nitrogen is used as blowing agent, blowing agent is present in an amount between 0.05% and 2.5%, preferably between 0.1% and 1.0% in some cases, and where carbon dioxide is used as blowing agent the mass flow of the blowing agent can be between 0.05% and 12% in some cases, between 0.1% and 6.0% in preferred embodiments. Although port 54 can be located at any of a variety of locations along the barrel, according to a preferred embodiment it is located just upstream from a mixing section 60 of the screw and at a location 62 of the screw where the screw includes unbroken flights.

A preferred embodiment of the blowing agent port includes multiple ports, e.g. two ports on opposing top and bottom sides of the barrel. In this preferred embodiment, port 54 is located at a region upstream from mixing section 60 of screw 38 (including highly-broken flights) at a distance upstream of the mixing section of no more than about 4 full flights, preferably no more than about 2 full flights, or no more than 1 full flight. Positioned as such, injected blowing agent is very rapidly and evenly mixed into a fluid polymeric stream to quickly produce a single-phase solution of the foamed material precursor and the blowing agent. Port 54, in a preferred embodiment, is a multi-hole port including a plurality of orifices connecting the blowing agent source with the extruder barrel. A plurality of ports can be provided about the extruder barrel at various positions radially and can be in alignment longitudinally with each other. For example, a plurality of ports can be placed at the 12 o'clock, 3 o'clock, 6 o'clock, and 9 o'clock positions about the extruder barrel, each including multiple orifices. In this manner, where each orifice is considered a blowing agent orifice, the invention includes extrusion apparatus having at least about 10, preferably at least about 40, more preferably at least about 100, more preferably at least about 300, more preferably at least about 500, and more preferably still at least about 700 blowing agent orifices in fluid communication with the extruder barrel, fluidly connecting the barrel with a source of blowing agent.

Also in preferred embodiments is an arrangement in which the blowing agent orifice or orifices are positioned along the extruder barrel at a location where, when a preferred screw is mounted in the barrel, the orifice or orifices are adjacent full, unbroken flights 62. In this manner, as the screw rotates, each flight, passes, or "wipes" each orifice periodically. This wiping increases rapid mixing of blowing agent and fluid foamed material precursor by, in one embodiment, essentially rapidly opening and closing each orifice by periodically blocking each orifice, when the flight is large enough relative to the orifice to completely block the orifice when in alignment therewith. The result is a distribution of relatively finely-divided, isolated regions of blowing agent in the fluid polymeric material immediately upon injection and prior to any mixing. In this arrangement, at a standard screw revolution speed of about 30 rpm, each orifice is passed by a flight at a rate of at least about 0.5 passes per second, more preferably at least about 1 pass per second, more preferably at least about 1.5 passes per second, and more preferably still at least about 2 passes per second. In preferred embodiments, orifices are positioned at a distance of from about 15 to about 30 barrel diameters from the beginning of the screw (at upstream end 34).

Downstream of region 50 is a nucleator 66 constructed to include a pressure-drop nucleating pathway 67. As used herein, "nucleating pathway" in the context of rapid pressure drop is meant to define a pathway that forms part of microcellular polymer foam extrusion apparatus and in which, under conditions in which the apparatus is designed to operate (typically at pressures of from about 1500 to about 30,000 psi upstream of the nucleator and at flow rates of greater than about 1 lb. polymeric material per hour), the pressure of a single-phase solution of polymeric material admixed with blowing agent in the system drops below the saturation pressure for the particular blowing agent concentration at a rate or rates facilitating nucleation. Nucleator 66 can be located in a variety of locations downstream of region 50 and upstream of mold 37. In a preferred embodiment, nucleator 66 is located in direct fluid communication with mold 37, such that the nucleator defines a nozzle connecting the extruder to the molding chamber and the nucleated polymer releasing end 70 defines an orifice of molding chamber 37. According to one set of embodiments, a nucleator is positioned upstream of a mold. Although not illustrated, another embodiment of nucleator 66 includes a nucleating pathway 67 constructed and arranged to have a variable cross-sectional dimension, that is, a pathway that can be adjusted in cross-section. A variable cross-section nucleating pathway allows the pressure drop rate in a stream of fluid polymeric material passing therethrough to be varied in order to achieve a desired nucleation density. While pathway 67 defines a nucleating pathway, some nucleation also may take place in the mold itself as pressure on the polymeric material drops at a very high rate during filling of the mold.

The system of FIG. 1 illustrates one general embodiment of the present invention in which a single-phase, non-nucleated solution of polymeric material and blowing agent is nucleated, via rapid pressure drop, while being urged into molding chamber 37 via the rotation of screw 38. This embodiment illustrates an intrusion molding technique and, in this embodiment, only one blowing agent injection port 54 need be utilized. In another embodiment, screw 38 of system 30 is a reciprocating screw and a system defines an injection molding system. In this embodiment screw 38 is mounted for reciprocation within barrel 32, and includes a plurality of blowing agent inlets or injection ports 54, 55, 57, 59, and 61 arranged axially along barrel 32 and each connecting barrel 32 fluidly to pressure and metering device 58 and a blowing agent source 56. Each of injection ports 54, 55, 57, 59, and 61 can include a mechanical shut-off valve 154, 155, 157, 159, and 161 respectively, which allow the flow of blowing agent into extruder barrel 38 to be controlled as a function of axial position of reciprocating screw 38 within the barrel.

The embodiment of the invention involving a reciprocating screw can be used to produce non-microcellular foams or microcellular foam. Where non-microcellular foam is to be produced, the charge that is accumulated in distal region 50 can be a multi-phase mixture including cells of blowing agent in polymeric material, at a relatively low pressure. Injection of such a mixture into mold 37 results in cell growth and production of conventional foam. Where microcellular material is to be produced, a single-phase, non-nucleated solution is accumulated in region 50 and is injected into mold 37 while nucleation takes place.

Although not shown, molding chamber 37 can include vents to allow air within the mold to escape during injection. The vents can be sized to provide sufficient back pressure during injection to control cell growth so that uniform foaming occurs. In another embodiment, a single-phase, non-nucleated solution of polymeric material and blowing agent is nucleated while being introduced into an open mold, then the mold is closed to shape a molded article.

Figure 2:
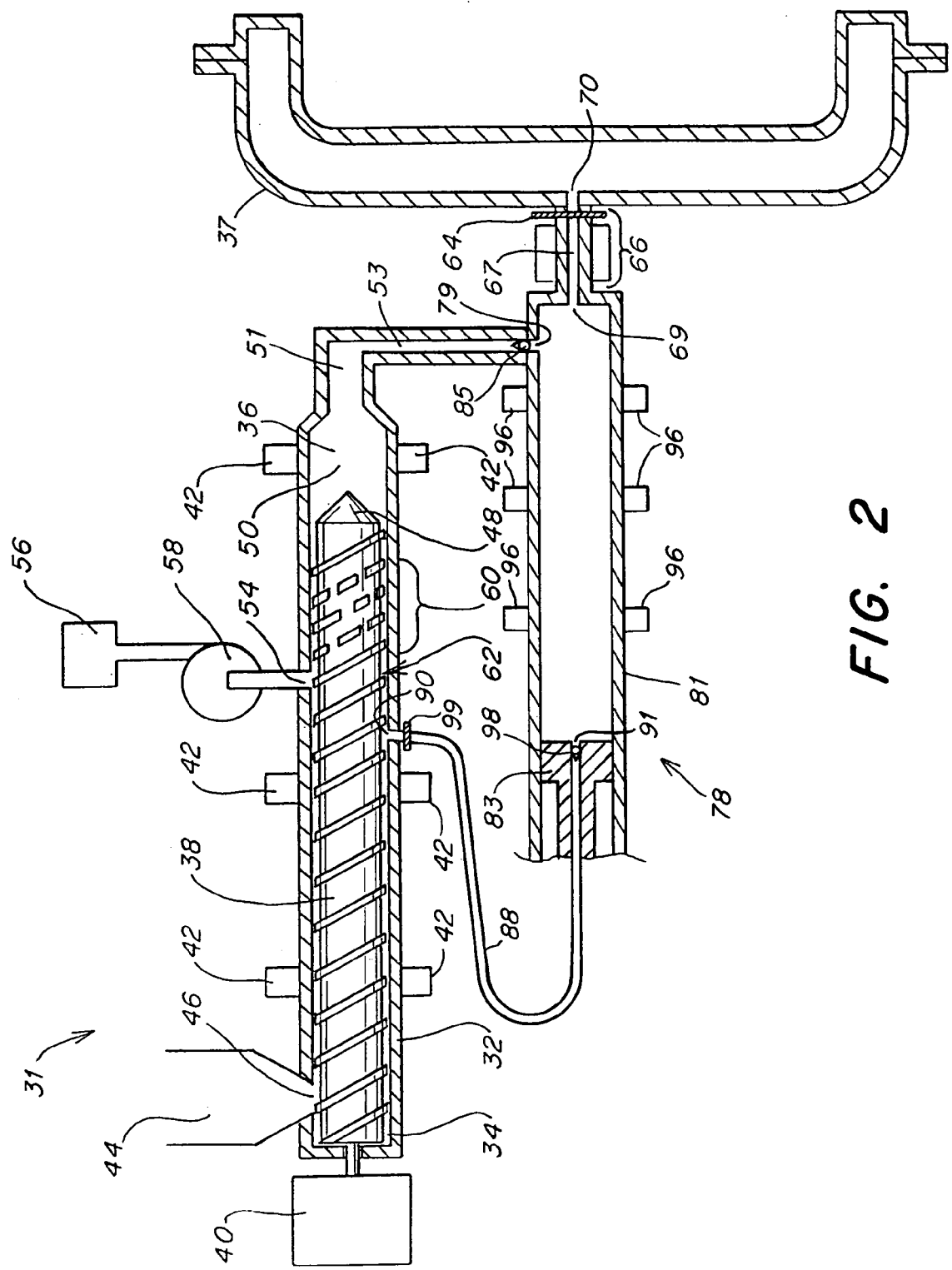
FIG. 2 is a schematic illustration of alternate injection molding apparatus, including an auxiliary accumulator, useful for the invention.
Figure 3:
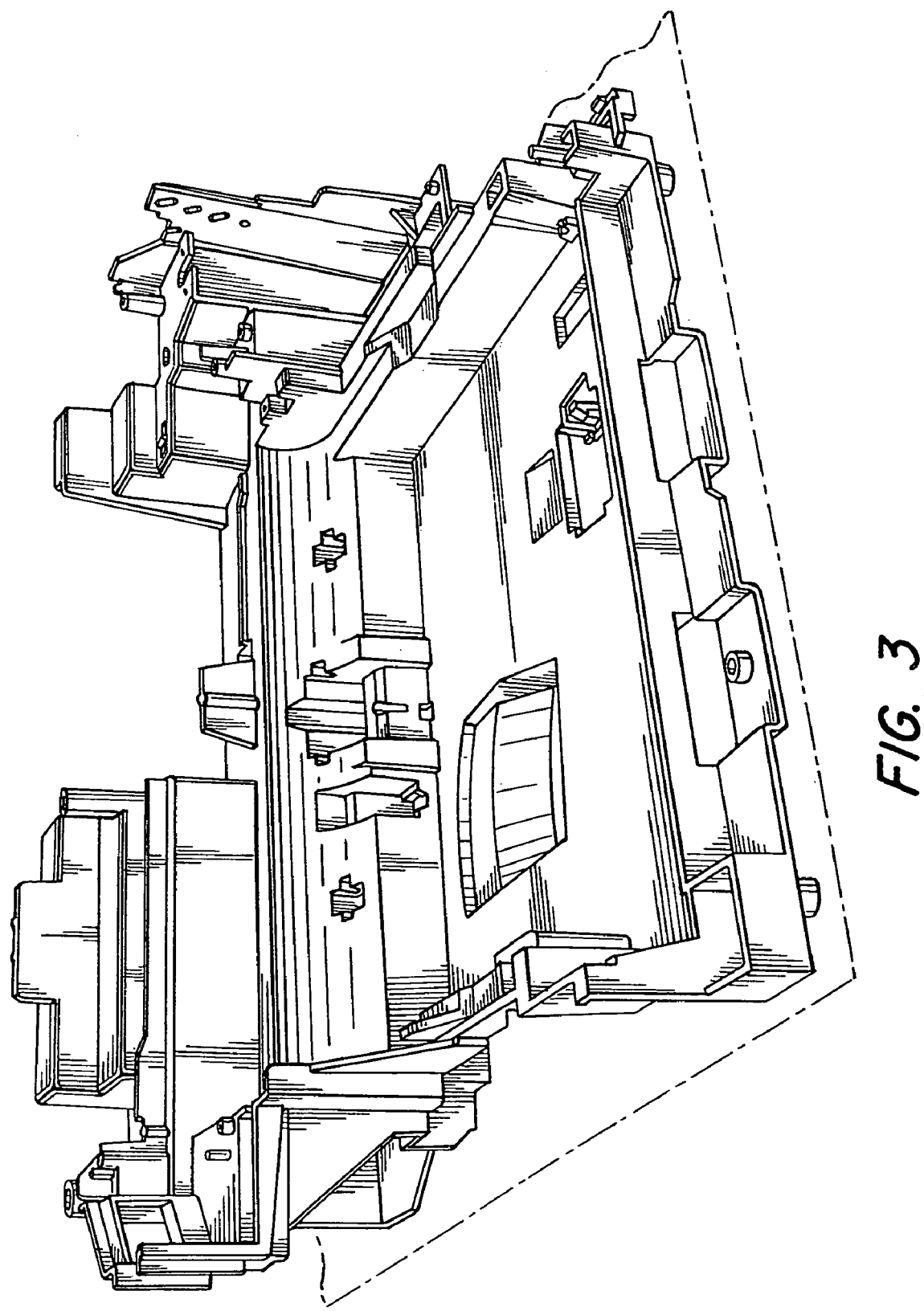
FIG. 3 is an isometric view of a printer chassis molded according to the invention.
Figure 4:
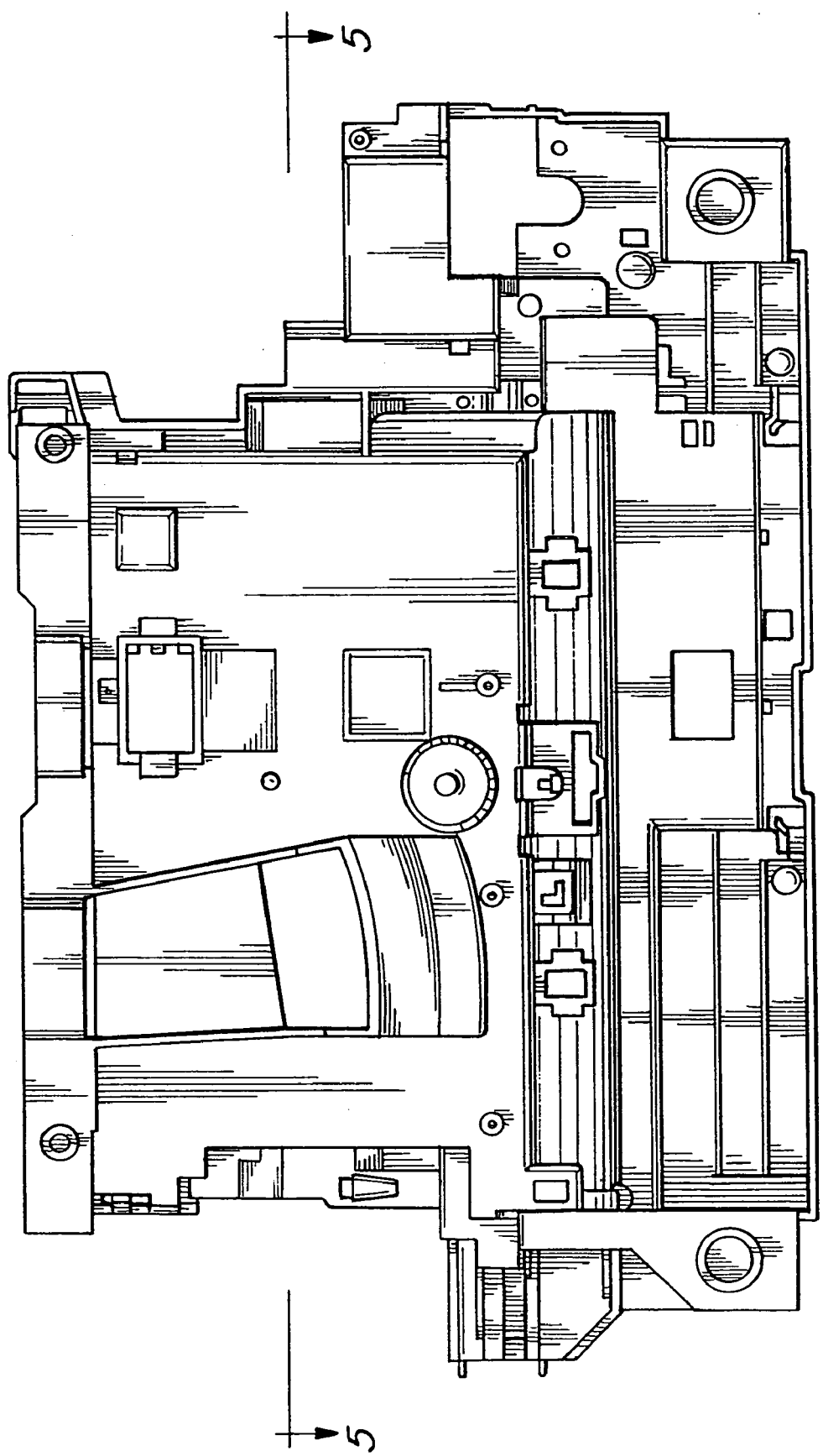
FIG. 4 is a bottom plan view of the printer chassis of FIG. 3.
Figure 5:
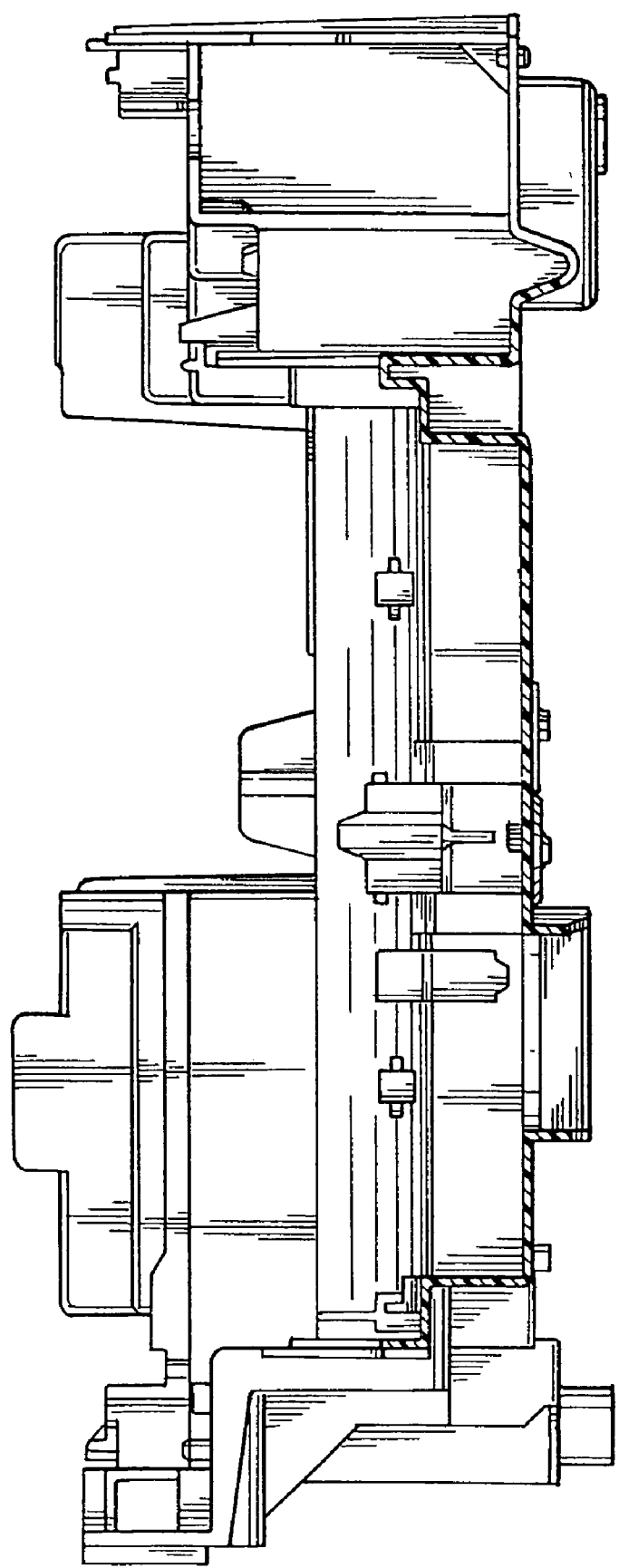
FIG. 5 is a longitudinal cross-sectional view taken along line 5—5 of FIG. 4.

According to another embodiment an injection molding system utilizing a separate accumulator is provided. Referring now to FIG. 2, an injection molding system 31 includes an extruder similar to that illustrated in FIG. 1. The extruder can include a reciprocating screw as in the system of FIG. 1. At least one accumulator 78 is provided for accumulating molten polymeric material prior to injection into molding chamber 37. The extruder includes an outlet 51 fluidly connected to an inlet 79 of the accumulator via a conduit 53 for delivering a mixture, such as a non-nucleated, single-phase solution of polymeric material and blowing agent to the accumulator.

Accumulator 78 includes, within a housing 81, a plunger 83 constructed and arranged to move axially (proximally and distally) within the accumulator housing. The plunger can retract proximally and allow the accumulator to be filled with polymeric material/blowing agent through inlet 79 and then can be urged distally to force the polymeric material/blowing agent mixture into mold 37. When retracting, a charge defined by single-phase solution of molten polymeric material and blowing agent is allowed to accumulate in accumulator 78. When accumulator 78 is full, a system such as, for example, a hydraulically controlled retractable injection cylinder (not shown) forces the accumulated charge through nucleator 66 and the resulting nucleated mixture into molding chamber 37. This arrangement illustrates another embodiment in which a non-nucleated, single-phase solution of polymeric material and blowing agent is nucleated as a result of the process of filling the molding chamber. Alternatively, a pressure drop nucleator can be positioned downstream of region 50 and upstream of accumulator 78, so that nucleated polymeric material is accumulated, rather than non-nucleated material, which then is injected into mold 37.

In another arrangement, a reciprocating screw extruder such as that illustrated in FIG. 1 can be used with system 31 of FIG. 2 so as to successively inject charges of polymeric material and blowing agent (which can remain non-nucleated or can be nucleated while being urged from the extruder into the accumulator) while pressure on plunger 83 remains high enough so that nucleation is prevented within the accumulator (or, if nucleated material is provided in the accumulator cell growth is prevented). When a plurality of charges have been introduced into the accumulator, shut-off valve 64 can be opened and plunger 83 driven distally to transfer the charge within the accumulator into mold 37. This can be advantageous for production of very large parts.

A series of valves, conduits, etc. associated with the arrangement of FIG. 2 is thoroughly described in International Patent Publication No. WO 98/31521, referenced above. The system can be used to make skin/foam/skin structures controllably.

The invention involves, in all embodiments, the ability to maintain pressure throughout the system adequate to prevent premature nucleation where nucleation is not desirable (upstream of the nucleator), or cell growth where nucleation has occurred but cell growth is not desired or is desirably controlled.

The invention provides for the production of molded microcellular polymeric articles or molded non-microcellular polymeric foam articles of a shape of a molding chamber, having a void volume of at least about 5%. Preferably, the void volume is at least about 10%, more preferably at least about 15%, more preferably at least about 20%, more preferably at least about 25%. The articles of the invention can include the above-noted void volumes in those sections that are of cross-sectional dimensions noted herein.

The supercritical fluid additive can serve at least two purposes, one being reducing the viscosity of molten polymeric material injected into a mold, and a second being that of a blowing agent, namely, forming a foamed polymeric article, preferably a microcellular article, having a void volume and/or cell size and/or cell density, as described above. In cases where little or no void volume is desired, low levels of supercritical fluid additive can be used. The advantages recognized in accordance with the invention through the use of a viscosity-reducing supercritical fluid additive can be achieved even while forming an article having a void volume of less than about 5%, or less than about 3%, or 1%, or a void volume of essentially 0. That is, the supercritical fluid additive may be present in an amount of less than about 1%, or less than about 0.5%.

As mentioned, the supercritical fluid additive allows for the injection of a precursor of a molded polymeric article, preferably a molded microcellular polymeric material, into a mold at reduced temperatures. Preferably, injection takes place at a molding chamber temperature of less than about 100° C., preferably less than about 75° C., 50° C., 30° C., or even less than about 10° C.

The invention also provides a system and method to produce foam molded parts with surfaces replicating solid parts. At least a portion of the surface of these parts is, free of splay and swirl visible to the naked human eye.

It is one feature of the invention that highly dimensionally-stable articles can be provided according to the invention. Cycle times can be reduced without compromising dimensional stability and, in some embodiments, while improving dimensional stability. In other embodiments cycle time may be reduced or may not be reduced, but is not increased, while dimensional stability is significantly improved. Articles as described in a U.S. patent application filed Sep. 29, 2000 entitled "Dimensionally-Stable, Thin, Molded Polymeric Material at Fast Cycle Time", by Kevin J. Levesque, David E. Pierick, and Levi A. Kishbaugh, incorporated herein by reference, can be made.

Figure 6:
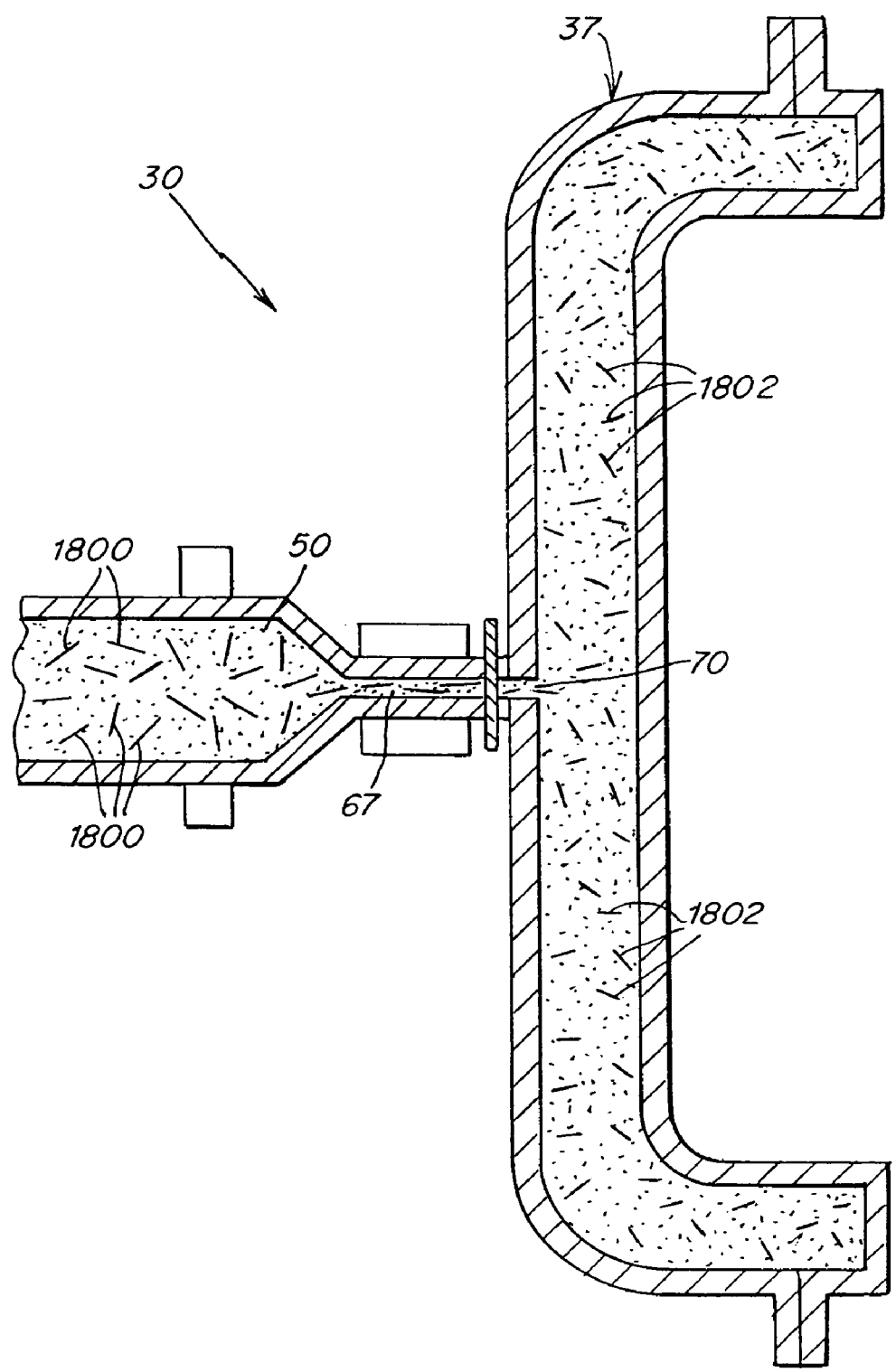
FIG. 6 is an enlarged schematic illustration of the distal portion of the extruder and mold of the injection molding apparatus shown in FIG. 1.

Referring now to FIG. 6, the downstream end and mold of the injection molding system of FIG. 1 is illustrated. As illustrated, system 30 includes polymeric material within region 50 of the extruder, and polymeric material entirely filling mold 37. In operation, screw 38 (not shown in FIG. 6) would be present in region 50, having been urged distally to inject polymeric material into the mold. For purposes of illustration, the screw is not shown.

The polymeric material within region 50 of the extruder includes a plurality of fibers 1800 of an initial length. In conventional molding processes, when fiber-laden material is injected from region 50 through nucleating pathway 67 (or a conventional nozzle in a conventional molding process), significant shear-induced stress is experienced by the fibers in nozzle 67, typically causing them to break. As illustrated, this results in a plurality of fibers 1802 dispersed within polymeric material in mold 37 of shorter length than the initial length of fibers 1800 within the extruder.

According to the invention, however, a viscosity-reducing additive such as a supercritical fluid, which can also serve as a blowing agent, is introduced into polymeric material prior to injection into the mold. The use of a viscosity-reducing additive results in molded parts with greater overall fiber length (mean and/or median) and/or less fiber breakage, relative to starting material or to molded parts produced essentially identically but without the use of the viscosity-reducing additive. Although not wishing to be bound by any theory, it is believed that the viscosity-reducing additive significantly reduces stress on the fibers during injection into the mold, significantly reducing the amount of fiber breakage during injection. This can result in significantly improved impact and stiffness properties of articles produced according to the method, as these performance benefits in molded articles are limited by the fiber length in the final, molded part. Alternatively, or in addition, reduced fiber breakage can be due to reduced clamp force in injection molding processes, facilitated by the use of the viscosity-reducing additive. Specifically, a polymer molding system can be used hat includes an extruder and a mold constructed and arranged to deliver blowing-agent-free molten polymeric material from the extruder into the mold and to eject a molded polymeric article from the mold having a void volume of essentially zero, will be set up with a minimum mold clamp force. That is, the system will include a clamp force sufficient to keep the mold closed during injection. The process of the invention allows such an apparatus to operate at a mold clamp force no more than 95% of the clamp force at which the system is held during molding of solid (viscosity-reducing additive—free and/or blowing-agent-free) material. Preferably, the second mold clamp force (that clamp force required using viscosity-reducing additive), is no more than about 85%, or 75%, or 65%, 55%, 45%, or even no more than about 35% of the clamp force for the solid material. More specifically, a molded polymeric article can be made with reduced fiber breakage by maintaining a clamp force on the mold of no more than about 3.5 ton/in$^2$, or no more than about 3, 1.751, 1.5, or 1 ton/in$^2$.

Where fibers 1800 are initially of a very short length, in conventional processes not involving a viscosity-reducing additive, at least some breakage will nevertheless occur, resulting in a decrease in mean length of fibers 1802 in the resultant article. The present invention, however, allows for polymeric material containing relatively short fibers 1800 to be injected into mold 37 with reduced or no breakage, in preferred embodiments maintaining the mean length of the fibers.

The typical gate size (within which is defined nozzle 67, or nucleating pathway 67 in microcellular embodiments of the invention) is from about 3 to about 20 cm in length, and from about 0.3 to about 1.3 cm in diameter. More specifically, gates may be from about 5 to about 15 cm in length, and about 0.3 to about 0.5, or about 0.5 to about 0.7, or about 0.7 to about 1.3 cm in length, and systems including all of these and other gate sizes can benefit from techniques of the invention for reducing fiber breakage.

A variety of fibers can be used for reinforcing of polymeric material, as known to those of ordinary skill in the art, and all such fibers are included for use in the present invention. Most common are glass fibers. Relatively short fibers, for example those of from about 0.6 to about 1 cm can be used, or relatively long fibers such as those of mean length of about 1.3 cm, 1.4 cm, 1.5 cm, or longer. In all cases, regardless of the initial mean length of fibers prior to injection into the mold, or type of fiber, or gate size, using a viscosity-reducing additive in accordance with the invention can unexpectedly significantly reduce fiber breakage.

Specifically, one method of the invention involves providing precursor (pre-mold) polymeric material including a plurality of fibers disbursed therein, the fibers having a mean and median length, and injecting the polymeric material into a mold and forming therein a molded polymeric article including fibers having a mean or median length no less than 50% the mean or median length of the fibers within the precursor polymeric material prior to injection into the mold. In preferred embodiments the mean or median fiber length after molding is no less than 60%, preferably no less than 70%, 80%, 90%, or even 95% that of the polymeric material prior to injection into the mold. These results can be achieved with fibers of the above initial mean lengths, and gate dimensions above.

In another set of embodiments a reduction in fiber breakage in accordance with the invention is realized in terms of fewer numbers of broken fibers. Specifically, one method involves providing precursor polymeric material including a plurality of fibers dispersed therein, the fibers having an average length, and injecting the polymeric material into a mold while maintaining the average length of the fibers at least 50% the average length of the fibers in the precursor material. The average length can be any fiber length described above.

In another embodiment a method of molding includes conveying fiber-containing polymeric material within a processing space in polymer processing apparatus, introducing a viscosity-reducing additive into the polymeric material in the processing space to form a mixture, and injecting the mixture into a mold. A molded article is formed in this process, wherein at least 10% of the total number of fibers in the molded article have a length greater than 0.55 mm. In preferred embodiments at least 20, 30, or 50% of the total number of fibers have this length, and the length preferably can be 0.60 or 0.65 mm at any of these percentage levels.

In another method precursor polymeric material includes a plurality of fibers having an average length of greater than 0.60 mm. The material is injected into a mold while maintaining the length of at least 10% of the total number of fibers at greater than 0.55 mm.

Preferably, at least 20, 30, or 50% of the total number of fibers remain of length greater than 0.55 mm, or preferably greater than 0.60 mm or 0.65 mm at any of these percentages. In another embodiment the precursor polymeric material is injected into the mold while maintaining the length of at least 70% of the fibers greater than 0.21 mm. In preferred embodiments at least 75, 80, or 85% of the fibers maintain a length greater than 0.23, 0.25, or 0.27 mm.

In another set of embodiments either of the methods in the above two paragraphs can result in a molded article wherein at least 70% of the total number of fibers have a length greater than 0.21 mm. In preferred embodiments at least. 75, 80, or 85% of the total number of fibers have a length greater than 0.23, 0.25, or 0.27 mm.

In another aspect the invention provides fiber-reinforced molded polymeric articles including fibers of large mean or median length. In one embodiment a molded article of the invention includes a plurality of fibers dispersed in a polymer matrix, wherein at least 50% of the total number of fibers have a length of greater than 0.6 mm. In other embodiments at least 60%, 70%, 80%, 90%, or 95% of the fibers have a length greater than 0.6 mm. In other embodiments any of these percentages of fibers have a length of greater than 0.7, 0.8, 0.9, or 1.0 mm.

Another molded article of the invention includes a plurality of fibers dispersed in a polymer matrix, wherein at least 70% of the total number of fibers have a length of at least 0.21 mm. Preferably at least 75, 80, or 85% of the fibers have a length greater than 0.23, 0.25, or 0.27 mm.

Another article of the invention, an injection-molded foam polymeric article containing a plurality of fibers, is formed in a mold from precursor fiber-containing polymeric material under set conditions, wherein at least 70% of the total number of fibers have a length at least 0.23 mm. The foam article is molded in equipment that can also be used to mold a solid molded polymeric article from identical precursor material but without any foaming agent. When the solid molded polymeric article is formed, conditions are adjusted slightly relative to the set conditions, but only to the extent necessary to distinguish producing a foam article from producing a solid article. Those of ordinary skill in the art will understand the meaning of a foam article and a solid article molded under essentially identical, set conditions, where the only difference in the conditions is that needed to render the article a foam, or a solid, respectively. The solid article molded under these conditions includes fibers less than 65% of which have a length at least 0.23 mm. Preferably, in the foam article, at least 75, 80, or 85% of the total number of fibers have a length at least 0.23, 0.25, 0.27 or 0.33 mm, and in each case the comparative solid article would have only 70, 75, or 80%, respectively, of the fibers that maintain the initial length. In preferred embodiments the foam article described immediately above includes fibers at least 10% of which have a length greater than 0.55 mm. In some embodiments no more than 30% of the fibers of the molded foam article have a length greater than 0.33 mm.

Another article is a foam polymeric article including a plurality of fibers,.formed in a mold from precursor fiber-containing polymeric material under set conditions. At least 70% of the total number of fibers have a length at least 0.21 mm. The conditions are such that when a solid polymeric article is formed in the mold under essentially identical conditions (adjusted only to the extent necessary to produce a solid article rather than a foam article) includes fibers at least 35% of which have a length less than 0.21 mm.

Another article of the invention is a molded polymeric material article that has a reduction in fiber orientation. Typically, during conventional molding processes, there is a tendency for fibers to become oriented in the direction in which polymeric material fills the mold. In other words, the long axis of the fibers become aligned with the direction in which polymeric material fills the mold. Such fiber alignment can cause molded articles produced according to conventional properties to have anisotropic properties. For example, mechanical properties measured along the direction in which fibers are oriented (i.e., the direction in which polymeric material fills the mold) can be significantly greater than mechanical properties measured in a perpendicular direction.

The reduction in fiber orientation in articles produced using methods of the present invention results in articles that have more isotropic properties. It is believed that the fibers more easily become disoriented because fiber flow and movement can be increased as a result of the lower viscosity. Also, the formation of cells in the articles may promote fiber disorientation.

In some embodiments, articles of the invention have properties measured in a first direction substantially in which polymeric material fills the mold that are relatively similar to properties measured in a second direction which is perpendicular to the first direction. For example, the ratio of flex modulus measured in the first direction over flex modulus measured in the second direction may be less than about 1.9. In some cases, the ratio of flex modulus measured in the first direction over flex modulus measured in the second direction may be less than about 1.7, less than about 1.5, or even less than about 1.3. The ratio may be controlled, at least to some extent, by processing parameters such as amount of blowing agent and injection temperature, amongst others. The desired ratio can depend upon the application in which the article is used. Flex modulus may be measured using the appropriate ASTM test.

In another embodiment, articles of the invention processed using the supercritical fluid additive have a ratio of flex modulus measured in the first direction (substantially in which polymeric material fills the mold) over flex modulus in a second direction (perpendicular to first direction) that is less than 95% of the ratio of flex modulus in the first direction over flex modulus in the second direction of a second molded, fiber-filled polymeric article processed without using supercritical fluid additive (i.e., free of supercritical fluid additive). In some embodiments, the ratio of flex modulus measured in the first direction over flex modulus in a second direction is less than 85%, 75%, or even 60%, the ratio of flex modulus in the first direction over flex modulus in the second direction of a second molded, fiber-filled polymeric article processed without using supercritical fluid additive (i.e., free of supercritical fluid additive).

In other embodiments, articles of the invention have a flex modulus measured along the length of the article that are relatively similar to the flex modulus measured along the width of the article. For example, the ratio of flex modulus measured along the length over flex modulus measured along the width may be less than about 1.9; in other cases, less than about 1.7; in other cases, less than about 1.5; and, in other cases, less than about 1.3. In some embodiments, such articles may have small length-to-thickness ratios as described further below.

It should also be understood that other mechanical properties (including tensile modulus, tensile strength and flex strength, amongst others) in addition to flex modulus may also be similarly balanced in articles produced according to techniques of the invention. Thus, the ratios described herein between measurements in the first direction (i.e., direction in which polymeric material fills the mold) and the second direction (i.e., perpendicular to first direction) also pertain to these properties, as well.

As described above, certain articles of the invention have reduced fiber orientation. In some cases, less than 70% of the total number of fibers are aligned in a direction within 30° of the direction in which polymeric material fills the mold while forming the article. In other words, the long axes of less than 70% of the total number of fibers are in a direction that is within 30° of the direction in which polymeric material fills the mold while forming the article. In some cases, less than 50% of the total number of fibers, or even less than 40% of the total number of fibers, are aligned in a direction within 30° of the direction in which polymeric material fills the mold while forming the article. The direction of fiber alignment may be determined, for example, by SEM analysis of a representative region of the article.

One feature of the invention is that very thin molded parts can be produced. In one set of embodiments, molded polymeric articles of the invention (preferably microcellular), have a shape corresponding to that of a molding chamber, and include at least one portion having a cross-sectional dimension of no more than about 0.100 inch. Thinner parts can be molded as well, including those having least one portion with a cross-sectional dimension of no more than about 0.050 inch or less. "Having a shape corresponding to that of a molding chamber", as used herein, means a part that is formed within a mold, preferably an injection-molded part. The shape may be identical to, or similar to, that of the molding chamber. The shape may deviate slightly from that of the molding chamber due to very slight deflection caused by internal pressure, by mold-cracking techniques, etc. In one set of embodiments the maximum thickness of the molded article is no more than about 0.080 inch, or 0.040 inch.

As mentioned, another feature is low molding cycle time. The system of the invention also allows very rapid cycle times of injection molding of polymeric material In particular, a cycle time (injecting precursor material, allowing the material to solidify in the molding chamber as a polymeric article, and removing the article from the mold and repeating) can be carried out at cycle time of less than about 4 minutes, preferably less than about 1 minute, more preferably less than about 45 seconds, more preferably less than about 30 seconds, and more preferably still less than about 25 seconds.

The invention allows for combinations of relatively more solid and relatively more void sections of molded articles to be made controllably. For example, a method involves injecting supercritical fluid additive that is a blowing agent into fluid polymeric article precursor from an orifice in a barrel of the polymer processing apparatus proximate a mixing region of a screw, while the screw is moving proximally within the barrel and the fluid precursor is essentially axially stationary, for a period of time sufficient to create a blowing agent-rich region of the fluid precursor proximate the orifice, while establishing a blowing agent-poor region of the fluid precursor upstream of the blowing agent-rich region. The screw then is advanced distally to position the blowing agent-poor region downstream of the orifice. In one embodiment, while the screw is advanced distally, the blowing agent-poor precursor and then the blowing agent-rich precursor is injected into mold and allowed to solidify in the mold. A blowing agent-poor precursor region can be established proximate interior walls of the mold while a blowing agent-rich precursor region can be established in a central portion of the mold. In another embodiment, while the screw is advanced distally, the blowing agent-rich precursor and then the blowing agent-poor precursor can be injected into mold and allowed to solidify in the mold. In this embodiment the blowing agent-rich precursor can be established at a region proximate interior walls of the mold while a blowing agent-poor precursor can be established at a region in a central portion of the mold.

Injection molded polymeric articles can be produced according to the invention having high length-to-thickness ratios. Length-to-thickness ratio, in this context, defines the ratio of the length of extension of a portion of a polymeric molded part extending away from the injection location in the mold (gate) and the thickness across that distance. That is, an injection-molded part will include a portion that is distalmost relative to the gate, and length is defined from the gate location (location on the part corresponding to the gate of the mold) to this distalmost location. An average thickness is defined along that length, i.e., an average thickness between the gate and the distalmost location from the gate. The length from the gate to the distalmost location, divided by the average wall thickness along that length, defines the length-to-thickness ratio. The invention provides molded polymeric materials having length-to-thickness ratios of at least about 50:1, 75:1, 100:1, 300:1, or 450:1, or 600:1, or 750:1, or 900:1, or 1200:1, or 1500:1, or 1800:1, or even 2000:1. These length-to-thickness ratios can define at least one portion of the article, or can define the entire article. For example, the entire article may have a length-to-thickness ratio of at least about 300:1, or other ratios described above.

The function and advantage of these and other embodiments of the present invention will be more fully understood from the examples below. The following examples are intended to illustrate the benefits of the present invention, but do not exemplify the full scope of the invention.

EXAMPLE 1

Printer Chassis

A Cincinnati Milacron Magna 400 400-ton reciprocating screw injection molding machine was used. Twenty percent glass fiber-reinforced polyphenylene oxide (PPO; GE Plastics Noryl™ resin) was used as the precursor polymer to be molded, and a supercritical fluid additive (nitrogen), also served as the blowing agent to form a molded foam chassis.

A system was used as shown schematically in FIG. 1.

The printer chassis mold used was a conventional single-cavity mold that operated with two plates and one parting line. It included a valve-gated hot sprue bushing that gated directly into the center of the part. The cavity was fairly complex in design and had a number of slides, core pins, and thin blades that help form the part. The dimensional requirements for the parts are tight and any warpage would be a concern.

The design of the mold was such that it produced a molded part having a nominal wall thickness of 2.5 mm. It included a number of bosses and deeply cored sections, which would limit cycle time or could cause dimensional problems using a conventional process. Given the wall thickness of 2.5 mm, the part has a flow factor of approximately 150:1, which allowed for a significant weight reduction with an optimized process.

Comparative: Molding of Solid Parts Without Supercritical Fluid Additive:

Solid parts were produced that weighed 603 grams each. A simple warpage measurement was made with the parts by placing them on a smooth surface and measuring the distance that one corner of the part was out of plane with the other three corners. The solid parts were used as a baseline for weight and properties with the supercritical fluid additive process of the invention.

Supercritical Fluid Additive Process:

Nitrogen was used as a supercritical fluid additive (which also served as blowing agent) and was varied from 0.05% to 0.10% during various sample runs. Microcellular foamed parts were produced that showed no signs of sink and replicated the mold cavity very precisely. Weight reductions (void volumes) of greater than 5% and on the order of 10% were easily obtained. Higher weight reductions can be achieved with minor process modification.

Cycle time:

The mold cycle close time consisted of injection, hold, and cooling times. Solid parts (comparative example, non-supercritical fluid additive) were produced with a cooling time of 15 seconds and a total mold close time of 20.8 seconds. Initial supercritical fluid additive molding times included cooling times of 15 seconds and a total mold closed time of 16.6 seconds. Other runs included cooling times of 10 seconds and a total mold closed time of 11.6 seconds, and were run successfully. Thus, a mold close time reduction of 44% was achieved with the supercritical fluid additive process.

Clamp tonnage:

When operated using the supercritical fluid additive process of the invention, clamp tonnage was reduced to 200 tons. It could not be lowered any further because 200 tons was the minimum setting on the machine during this run. Notwithstanding, a 50% reduction in required clamp force was easily achieved, and estimates by the inventors based upon an intimate knowledge of the process show that the clamp tonnage can be set lower, such as on the order of 150 tons.

Strength Indicative of Fiber Length

Parts produced in this manner were made using no viscosity-reducing additive, as compared to two different levels of viscosity-reducing additive, and a comparison made as to strength indicative of fiber length (minimization of breakage upon entering the mold). Greater weight reduction resulted in greater strength (Tables 1 & 2). Sample bars and plaques were cut in the flow direction on the flat wall at the back of the printer chassis. Testing was performed according to ASTM protocol.

TABLE 1

| Trial # | % Weight Reduction | Flexural Modulus |
|---|---|---|
| 1. | 0 (solid) | 2730 MPa |
| 2. | 6.3 | 2833 MPa |
| 3. | 8.8 | 2922 MPa |

TABLE 2

| Trial # | Impact Strength |
|---|---|
| 1. | 7.3 kJ/m$^2$ |
| 4. | 9.7 kJ/m$^2$ |

EXAMPLE 2

Injection-Molded Blower Housing

A Cincinnati Milacron Magna 400 400-ton reciprocating screw injection molding machine as described in Example 1 was used. Two precursor polymer materials were used, namely, (1) Celstran PP-GF40-02-4 40% long glass fiber filled propylene, Length P11, and (2) Celstran PA6-GF50-03 50% long glass fiber filled nylon, Length P11. The mold was that of a blower housing.

Figure 7:
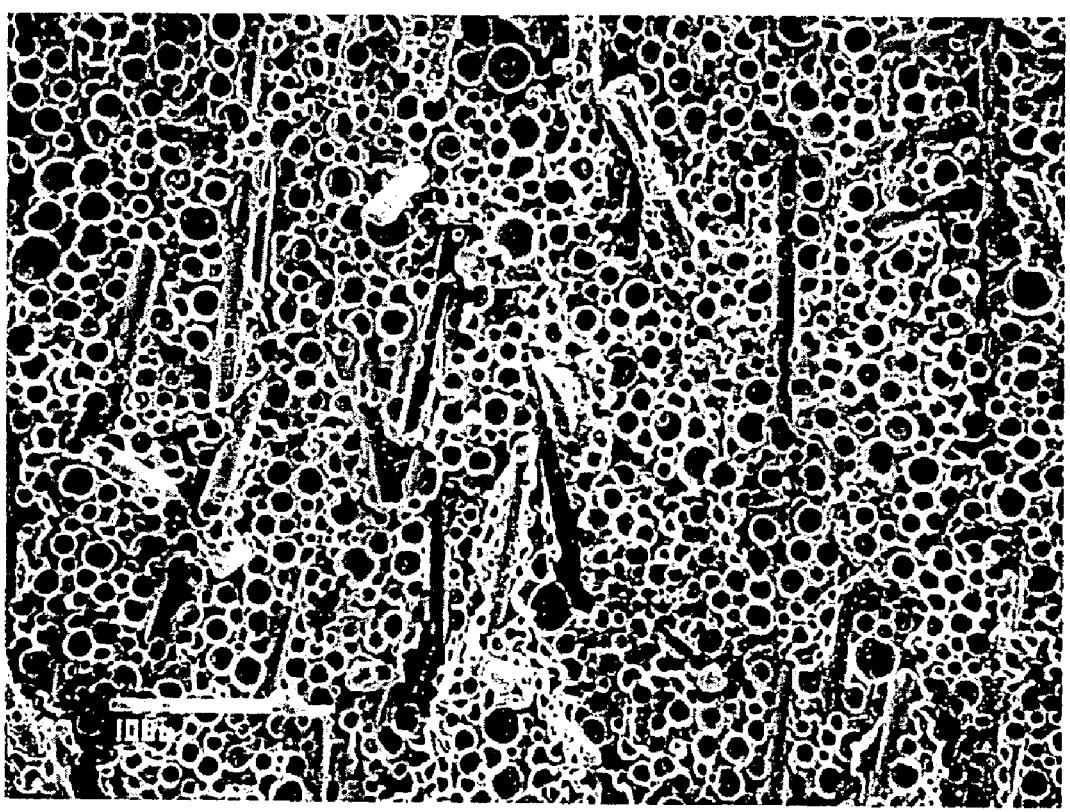
FIG. 7 is a photocopy of a scanning electron micrograph (SEM) image of a fiber-reinforced microcellular article produced according to the invention.

Celstran PA6-GF50-03 50% long glass fiber filled nylon: The process described above was also run in 50% glass filled nylon. Nitrogen was used as supercritical fluid additive at 0.2, 0.4 and 0.6% loading. Solid material was produced as well as microcellular material at weight reduction of 6 and 11%. The nylon process was run with the barrel heats set as follows. The front barrel zones containing the supercritical fluid were set to 490 F. This is 70 F below the standard solid process settings (560 F). The rear zones were set to 530 in order to achieve proper screw recovery. Void volume of approximately 20% was observed. The mold was set at 160 F. in the front and 70 F in the back. All nylon process studies were run at 200 tons. High-quality, microcellular polymeric material was formed. FIG. 7 is a photocopy of an SEM image of the resultant product.

Comparative tests were run between molding articles without viscosity-reducing additive and molding articles with viscosity-reducing additive. Stronger articles were observed with trials using a viscosity-reducing additive, indicating better maintenance of fiber length in those trials. Table 3, below, shows these results.

TABLE 3

| Trial # | % Weight Reduction | Displacement at Yield Cross-Flow direction (CF) | Displacement at Yield Flow Direction (F) | Gardner (lb.) |
|---|---|---|---|---|
| 5. | 0% | 0.326 | 0.216 | 36 |
| 6. | 6% | 0.308 | 0.211 | 36 |
| 7. | 11% | 0.295 | 0.228 | 36 |

Figure 9:
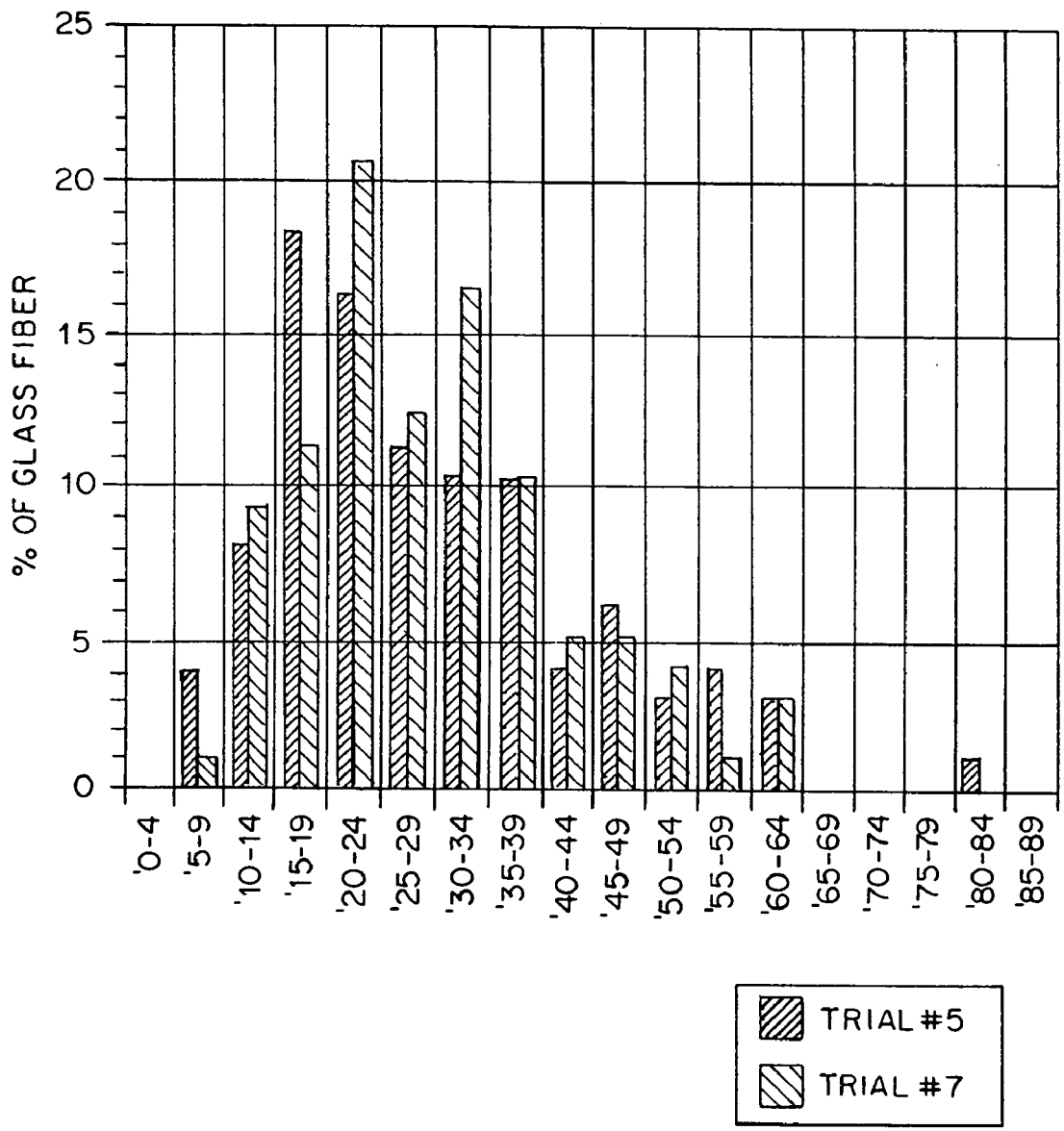
FIG. 9 shows fiber length distribution of a molded article using a supercritical fluid additive as compared to one molded without a supercritical fluid additive in accordance with the invention.

FIG. 9 shows glass fiber length distribution of the sample of Trial #5 (no supercritical fluid additive) and Trial #7 (supercritical additive), showing increased fiber length with use of a supercritical fluid additive

EXAMPLE 3

Injection Molding of Fiber-Reinforced Condensate Pan

An injection-molding system as described in Example 1 was used. Precursor material was 10% glass-filled polycarbonate, specifically, GE ML-5139 (GE Plastics). As above, solid parts were made in order to establish a standard, comparative process and article.

Figure 8:
FIG. 8 is photocopy of an SEM image of another fiber-reinforced microcellular article produced according to the invention.

Articles then were molded using a supercritical fluid additive, specifically with 0.2% nitrogen. Samples were run at 10, 15 and 20% weight reductions. FIG. 8 is a photocopy of an SEM image of a cross-section of a resultant article.

Table 4, below, shows increased strength of molded drip trays having viscosity reducing additives, consistent with longer fiber lengths shown in Table 3.

TABLE 4

| Trial # | % Weight Reduction | Displacement at Yield (CF) | Displacement at Yield (F) |
|---|---|---|---|
| 8. | 0 | 0.340 | 0.337 |
| 9. | 7% | 0.343 | 0.352 |
| 10. | 13% | 0.326 | 0.325 |
| 11. | 27% | 0.262 | 0.314 |

Figure 10:
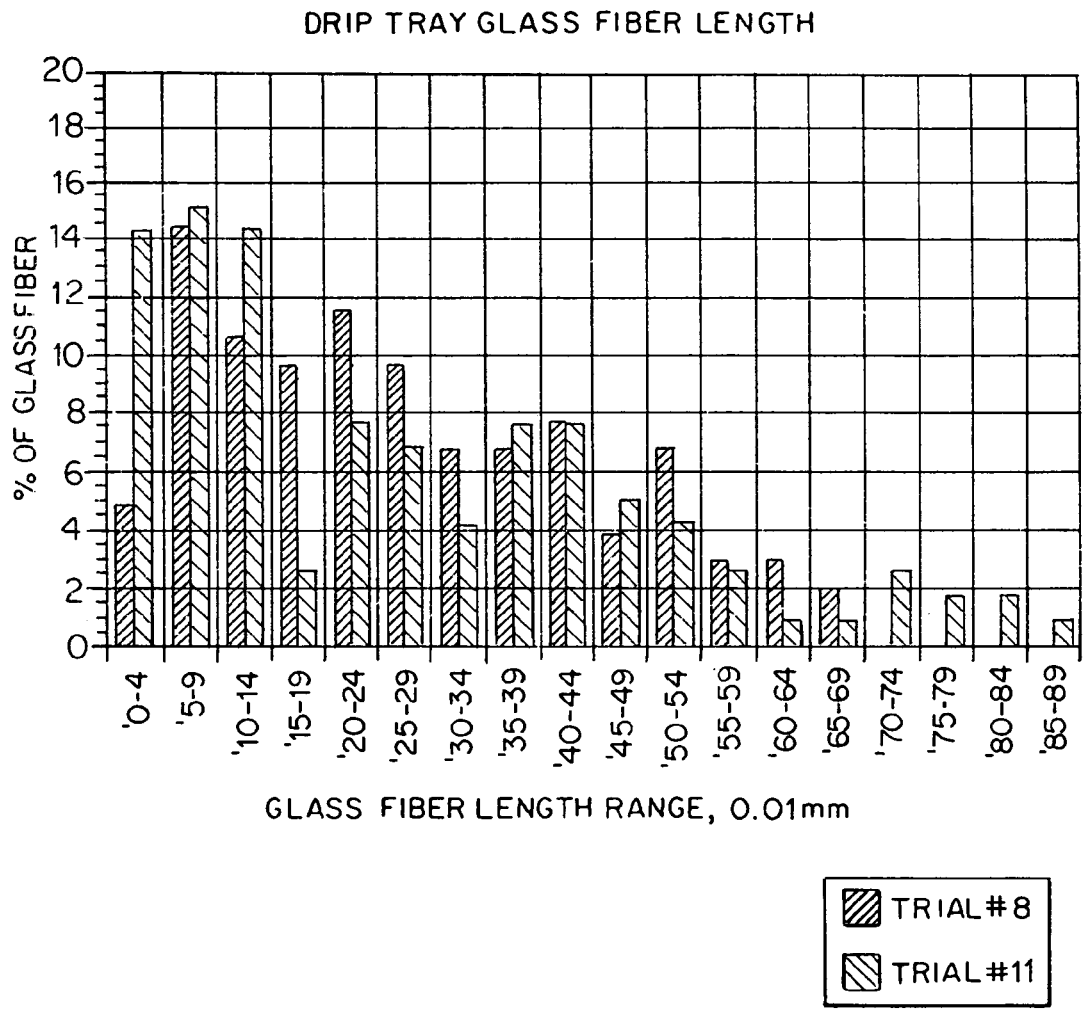
FIG. 10 shows another example of a comparison of fiber length in an article molded using a supercritical fluid additive as compared to an article molded without a supercritical fluid additive.

FIG. 10 shows condensate pan (drip tray) glass fiber length distribution of the molded article without a supercritical fluid additive (Trial #8) as compared to Trial #11 in which supercritical fluid additive was used, showing increased fiber length distribution.

Table 5 (below) shows fiber length mean, standard deviation, and median of the fibers of various trials of Examples 2 and 3.

TABLE 5

|  | Trial #8 | Trial #11 | Trial #5 | Trial #3 |
|---|---|---|---|---|
| Mean: | 27 | 26 | 29 | 29 |
| Standard Deviation: | 17 | 22 | 15 | 13 |
| Median: | 24 | 22 | 26 | 28 |

EXAMPLE 4

An Engel 150 ton injection molding system was used. The system included an accumulator separate from the extruder similar to the system shown in FIG. 2. The mold was a single cavity plaque mold (4 inches×4 inches×0.080 inches) with a single-tab gate along one edge.

The precursor polymeric material used was a 30% fiber glass reinforced PBT (polybutylene terephthalate) (Ticona). Barrel heating temperatures were set as follows (from feed section to end of barrel): 450° F., 460° F., 475° F., 475° F., and 480° F. The nozzle temperature was set at 480° F. The mold temperature was set at 175° F.

As in the examples above, comparative tests were run to produce molded articles with processes that use a viscosity reducing agent, and processes that do not use a viscosity reducing agent. When used, nitrogen was introduced into the polymeric material in the extruder as the viscosity reducing agent. The amount of nitrogen added was about 0.5 percent by weight of the total mixture of polymeric material and blowing agent. Samples made without the viscosity reducing agent were molded at an injection speed of 1 inch/sec. Samples made with the viscosity reducing agent were molded at injection speeds of 1 inch/sec and 4 inch/sec. The presence of the viscosity reducing agent enabled molding at the higher injection speed of 4 inch/sec which was not possible for the process that did not use the viscosity reducing agent.

The processes that used the viscosity reducing agent produced microcellular, fiber-filled polymeric foam articles. At an injection speed of 1 inch/sec, the foam article had a density reduction of about 26%. At an injection speed of 4 inch/sec, the foam article had a density reduction of about 24%. The process that did not use the viscosity reducing agent produced a solid, fiber-filled polymeric article with no density reduction.

Flexural properties of the samples were measured following ASTM D790-92. The samples were measured in two directions: (1) the direction in which polymeric material filled the mold (flow direction), and (2) the direction perpendicular to the direction of flow (transverse direction). The testing data is summarized in Table 6 below. SEM images were taken of representative cross-sections of the samples.

TABLE 6

| % $N_2$ | Density Reduction (%) | Injection Speed (1/s) | Modulus: Flow Direction (Pa) | Modulus: Transverse Direction (Pa) | Ratio of Modulus Flow/Transverse |
|---|---|---|---|---|---|
| 0 | 0 | 1.0 | 719,000 | 361,000 | 1.99 |
|  | (26) |  | (531,000) | (267,000) |  |
|  | (24) |  | (547,000) | (275,000) |  |

TABLE 6-continued

| % N₂ | Density Reduction (%) | Injection Speed (1/s) | Modulus: Flow Direction (Pa) | Modulus: Transverse Direction (Pa) | Ratio of Modulus Flow/ Transverse |
|---|---|---|---|---|---|
| 0.5 | 26 | 1.0 | 527,000 | 279,000 | 1.89 |
| 0.5 | 24 | 4.0 | 524,000 | 344,000 | 1.52 |

As shown in the data above, use of the viscosity reduction agent results in a reduction of the ratio of the modulus in the flow direction over the modulus in the transverse direction. This shows that articles produced using the viscosity reducing agent have more isotropic properties than articles produced without the viscosity reducing agent.

The foam article samples (produced with $N_2$) have lower moduli than the solid article sample (produced without $N_2$) as a result of their reduced density. However, when the moduli of the solid sample are multiplied by a reduction factor (assuming a linear reduction in modulus with density) to yield a predicted value, the predicted values are comparable to the moduli obtained for the foam article samples. The predicted values are shown in parentheses in Table 6.

Figure 11:
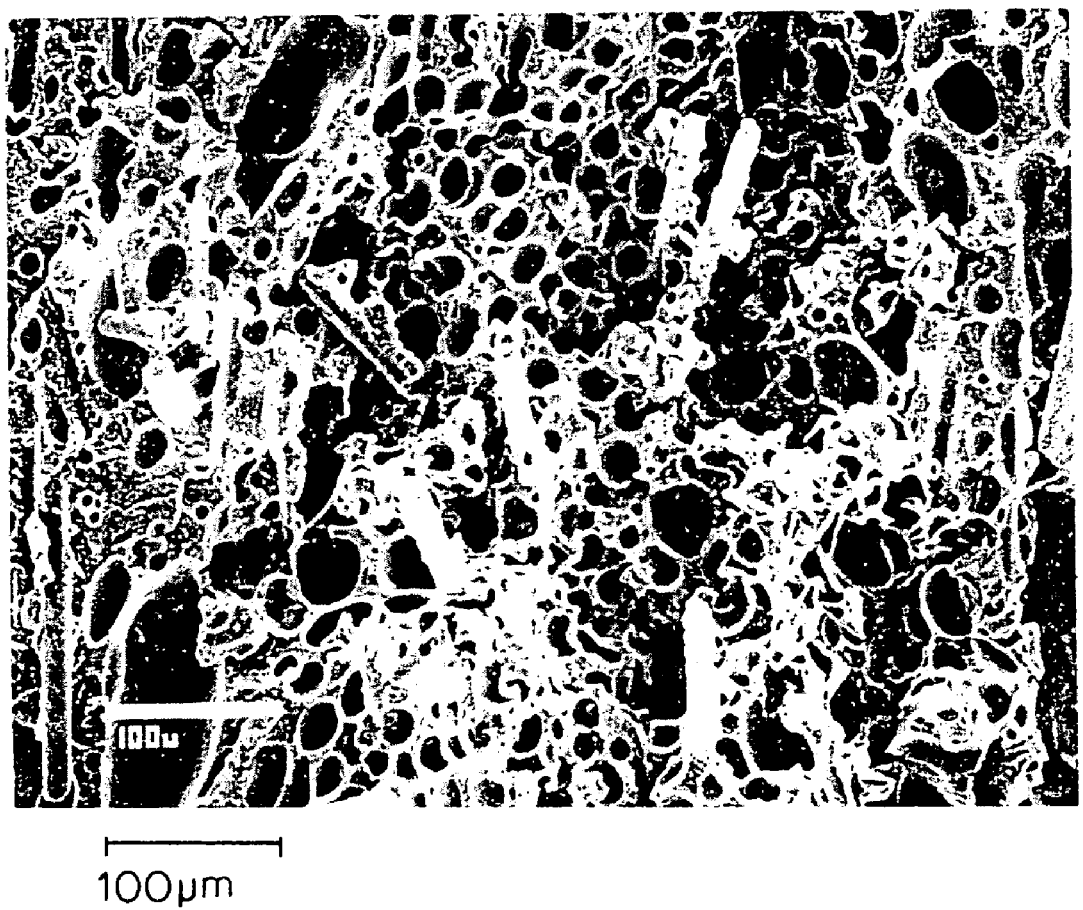
FIG. 11 is a photocopy of an SEM image of a fiber-reinforced article produced in Example 4 in accordance with the invention.
Figure 12:
FIG. 12 is a photocopy of an SEM image of a fiber-reinforced article produced in Example 4 in accordance with a comparative technique.

FIGS. 11 and 12 are respective photocopies of the SEM images taken of an article produced with the viscosity agent, and an article produced without the viscosity agent. FIG. 12 shows that the majority of the fibers are aligned in the direction in which the polymeric material fills the mold when the viscosity reduction agent is not used. FIG. 11 shows significantly less alignment of the fibers with the direction in which the polymeric material fills the mold when the viscosity reduction agent is used. The reduction of fiber alignment in the filling direction leads to the reduction in the ratio of modulus in the flow direction over modulus in the transverse direction.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described. In the claims the words "including", "carrying", "having", and the like mean, as "comprising", including but not limited to.

What is claimed is:

1. An injection-molded polymeric foam article including a plurality of glass fibers dispersed in a polymer foam matrix, wherein at least 10% of the total number of fibers have a length greater than 0.55 mm and the article includes a portion defining a first direction substantially in which polymeric material fills a mold while forming the article and a second direction perpendicular to the first direction, wherein a ratio of flex modulus measured in the first direction over flex modulus measured in the second direction is less than about 1.9.

2. An article as in claim 1, wherein the polymer foam has a void volume of at least about 5%.

3. An article as in claim 1, wherein the polymer foam has a void volume of at least about 10%.

4. An article as in claim 1, wherein the polymer foam has a void volume of at least about 20%.

5. An article as in claim 1, wherein the article includes at least one portion having a cross-sectional dimension of no more than about 0.100 inch.

6. An article as in claim 1, wherein the polymer foam has an average cell size of less than about 100 microns.

7. An article as in claim 1, wherein the polymer foam comprises microcellular material that is essentially closed-cell.

8. An article as in claim 1, wherein the polymer foam has a cell density of at least about $10^6$ cells per cubic centimeter.

9. An article as in claim 1, wherein the article has a length-to-thickness ratio of at least about 75:1.

10. A method of injection molding a polymeric article comprising:

conveying polymeric material including a plurality of glass fibers dispersed therein in a downstream direction within a processing space in a polymer processing apparatus;

introducing a viscosity reducing additive into the polymeric material in the processing space to form a mixture of polymeric material and viscosity reducing additive;

injecting the mixture into a mold; and forming an injection-molded polymer foam article having glass fibers dispersed in a polymer foam matrix, wherein at least 10% of the total number of the fibers in the molded article have a length greater than 0.55 mm and the article includes a portion defining a first direction substantially in which polymeric material fills the mold and a second direction perpendicular to the first direction, wherein a ratio of flex modulus measured in the first direction over flex modulus measured in the second direction is less than about 1.9.

11. A method as in claim 10, wherein at least 20% of the total number of the fibers in the article have a length greater than 0.55 mm.

12. A method as in claim 10, further comprising forming a single-phase solution of the mixture and nucleating the single-phase solution while introducing the mixture into the mold, allowing the nucleated mixture to undergo cell growth, solidifying the mixture in the shape of the mold to form a microcellular polymeric foam article in the shape of the mold, and removing the microcellular polymeric foam article from the mold while allowing the article to retain the shape of the mold.

13. A method as in claim 12, comprising nucleating the single-phase solution by subjecting the solution to a pressure drop at a rate sufficient to cause nucleation while passing the stream into the mold.

14. A method as in claim 10, wherein the viscosity reducing additive comprises nitrogen.

15. A method as in claim 10, wherein the viscosity reducing additive comprises carbon dioxide.

16. An article as in claim 1, wherein the article is essentially free of residual blowing agent or free of reaction by-products of chemical blowing agent.

17. Art article as in claim 1, wherein at least 50% of the total number of fibers have a length greater than 0.55 mm.

18. An article as in claim 1, wherein less than 70% of the total number of the fibers are aligned in a direction within 30° of the first direction.

19. A method as in claim 10, wherein the article is a microcellular foam having an average cell size of less than 100 microns.

20. A method as in claim 10, wherein the a weight percentage of the viscosity reducing agent is between about 0.05% and 10% based on the weight of the mixture.

21. A method as in claim 10, wherein the viscosity reducing agent is a supercritical fluid additive.

22. A method as in claim 10, comprising maintaining a mean length of the fibers in the molded article at least 50% a mean length of fibers in a precursor of the polymeric material.

23. A method as in claim 10, wherein the viscosity reducing additive is a blowing agent.

24. A method as in claim 23, comprising introducing the blowing agent into the polymeric material through multiple blowing agent ports.

* * * * *

UNITED STATES PATENT AND TRADEMARK OFFICE
CERTIFICATE OF CORRECTION

PATENT NO. : 7,364,788 B2
APPLICATION NO. : 10/744757
DATED : April 29, 2008
INVENTOR(S) : Levi A. Kishbaugh et al.

It is certified that error appears in the above-identified patent and that said Letters Patent is hereby corrected as shown below:

Claim 17, line 55 col. 22, "Art article" should read "An article"; and

Claim 20, line 63 col. 22, "wherein the a weight" should read "wherein a weight".

Signed and Sealed this

Seventeenth Day of March, 2009

JOHN DOLL
*Acting Director of the United States Patent and Trademark Office*